Sept. 2, 1952 W. C. SCHWANTES 2,609,014
TRAVELING SAW AND SAW TABLE THEREFOR
Filed Oct. 11, 1948 4 Sheets-Sheet 1
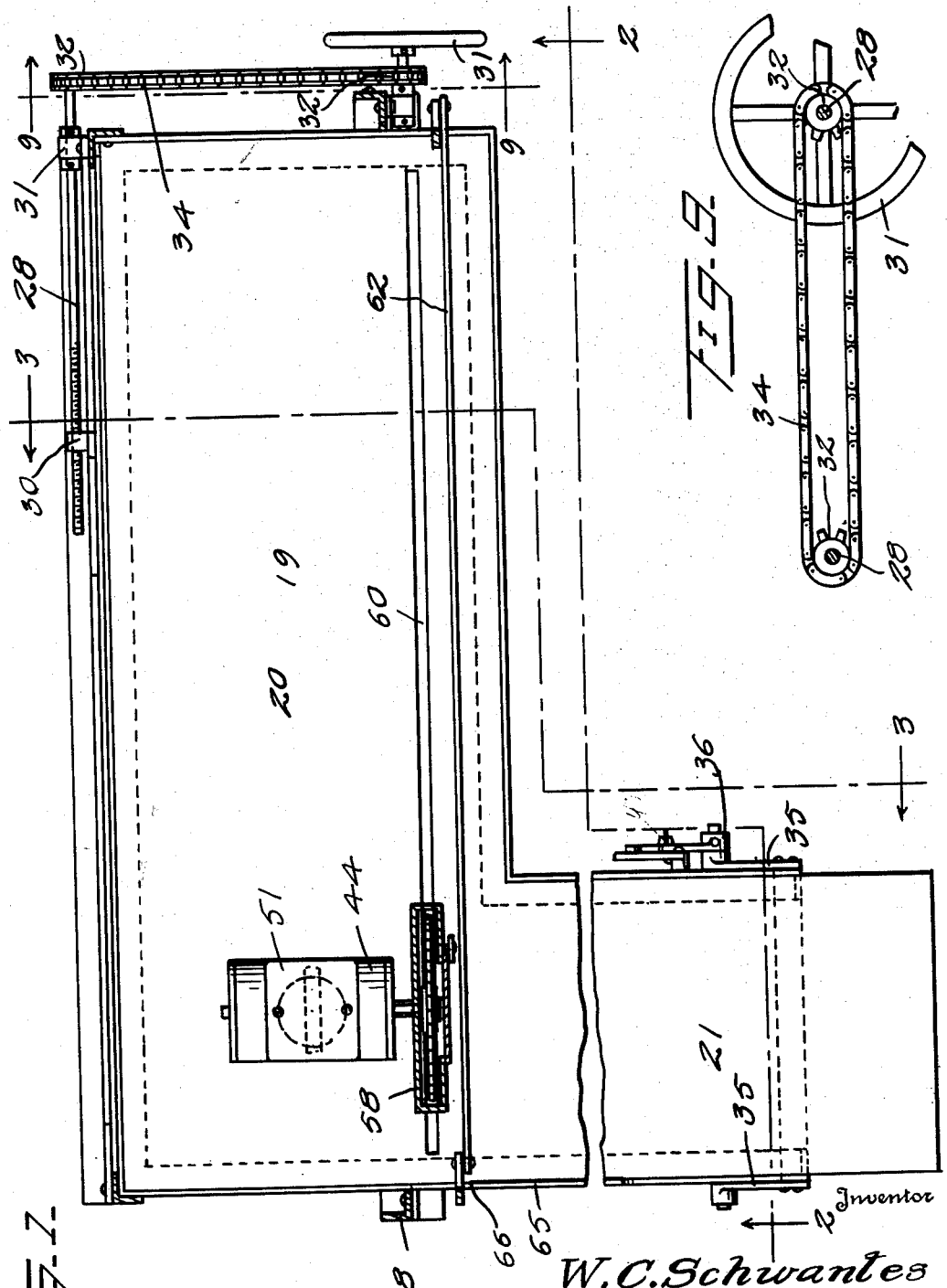
W. C. Schwantes
By
Kimmel & Crowell Attys.

Sept. 2, 1952 W. C. SCHWANTES 2,609,014
TRAVELING SAW AND SAW TABLE THEREFOR
Filed Oct. 11, 1948 4 Sheets-Sheet 2
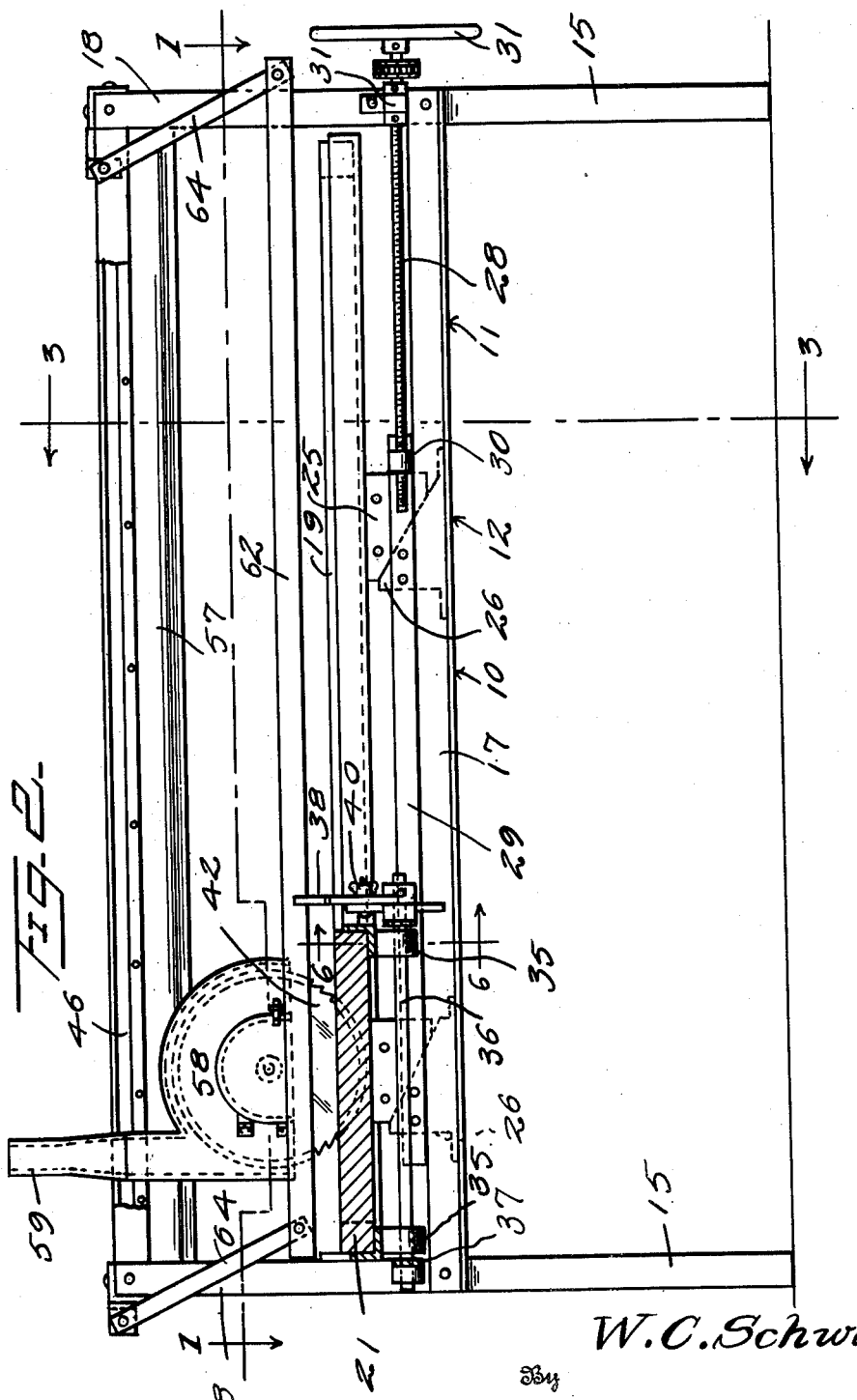
Inventor
W. C. Schwantes
By
Kimmel & Crowell Attys.

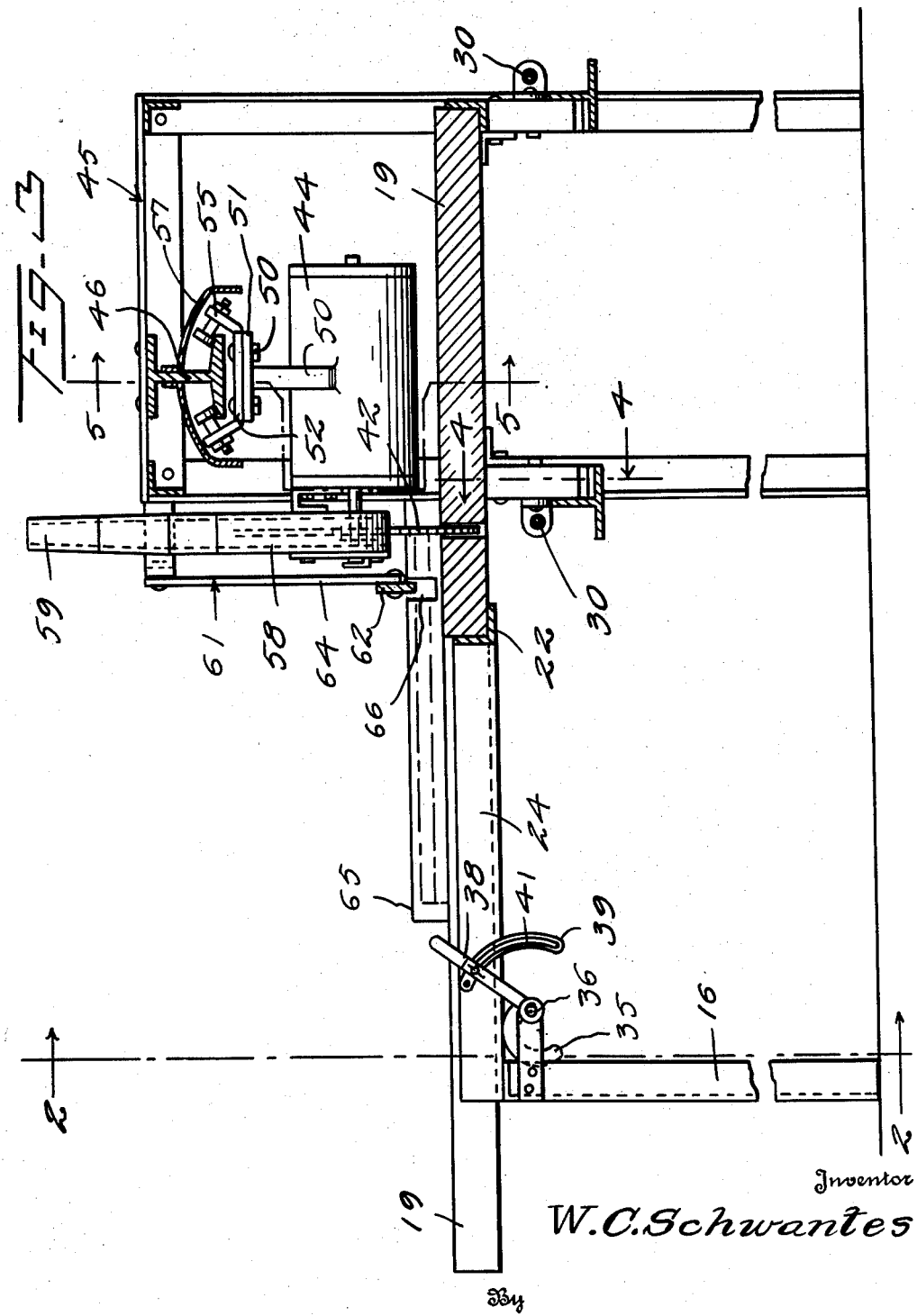

Sept. 2, 1952 W. C. SCHWANTES 2,609,014
TRAVELING SAW AND SAW TABLE THEREFOR
Filed Oct. 11, 1948 4 Sheets-Sheet 4
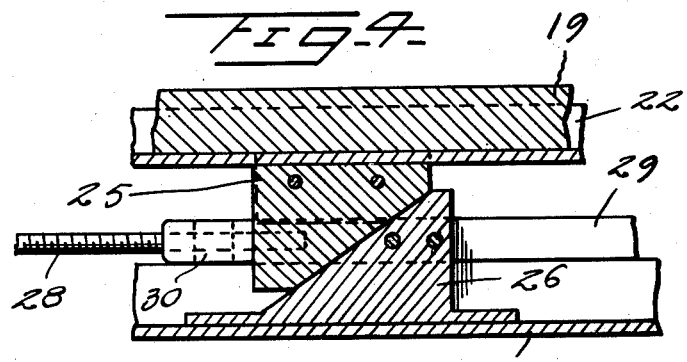
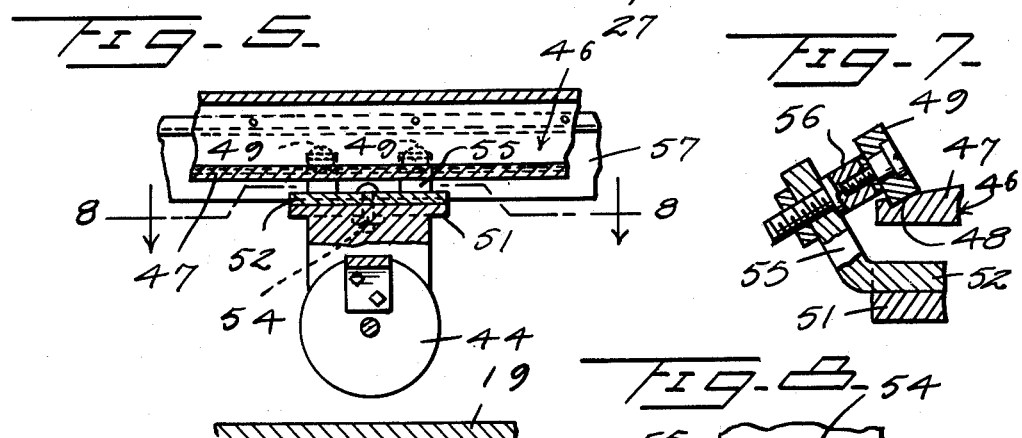
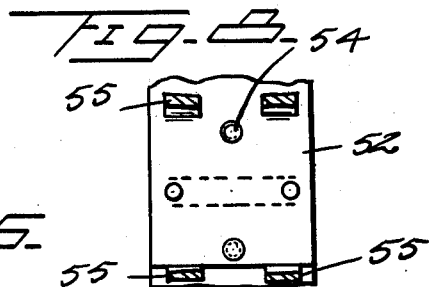
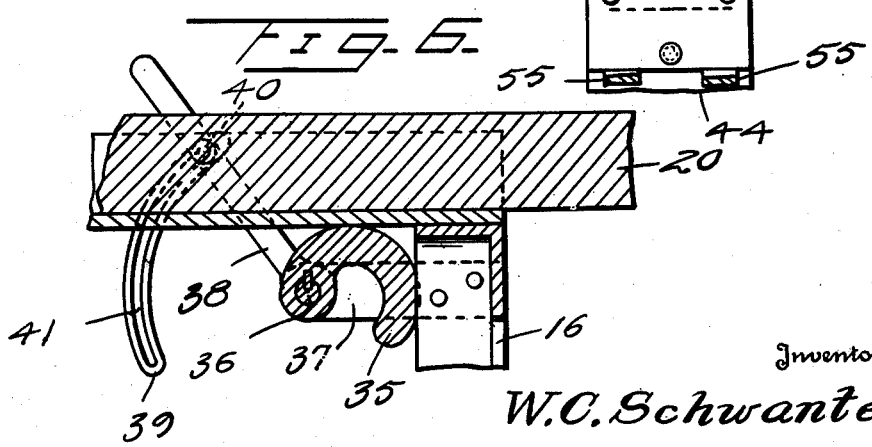
Inventor
W. C. Schwantes
By Kimmel & Crowell
Attys.

Patented Sept. 2, 1952

2,609,014

UNITED STATES PATENT OFFICE 2,609,014

TRAVELING SAW AND SAW TABLE THEREFOR

William C. Schwantes, Manitowoc, Wis.

Application October 11, 1948, Serial No. 53,939

1 Claim. (Cl. 143—47)

This invention relates to an improved saw and saw table.

It is an object of this invention to provide a saw and saw table of the kind to be more particularly described hereinafter in which the saw is supported for sliding along the length of the table and means is provided in the structure of the saw table for raising the table top and work supported thereon for engagement with the saw. The saw is a rotary saw driven by an electric motor and particularly adapted for cutting plywood or veneer.

Another object of this invention is to provide a device of this kind which provides for the faster and more accurate cutting of mill work as windows, cabinets, mouldings, etc.

Still another object of this invention is to provide a device of this kind on which very thin sheets of veneer may be cut separately or in piles, there being provided a holding or clamping device swingable on the frame for holding down the sheets of veneer while they are being cut.

With the above and other objects in view, my invention consists in the arrangement, combination and details of construction disclosed in the drawings and specification, and then more particularly pointed out in the appended claim.

In the drawings,

Figure 1 is a top plan view partly broken away and partly in section, of the improved saw table constructed according to an embodiment of my invention, Figure 2 is a longitudinal section taken on the line 2—2 of Figure 1, Figure 3 is a transverse section taken on the line 3—3 of Figure 1, Figure 4 is a fragmentary detail section taken on the line 4—4 of Figure 3, Figure 5 is a detail section taken on the line 5—5 of Figure 3, Figure 6 is a detail section taken on the line 6—6 of Figure 2, Figure 7 is a fragmentary section showing the mounting of the motor supporting roller, Figure 8 is a fragmentary section taken on the line 8—8 of Figure 5, Figure 9 is a fragmentary detail section taken on the line 9—9 of Figure 1.

Referring to the drawings, the numeral 10 designates generally an improved saw table in which the table top is adjustably mounted for movement upwardly or downwardly relative to a saw which is slidably supported above the table top. The saw table 10 is formed with a fixed table frame 11 which is substantially L-shaped in configuration, having a longitudinal portion 12 and a transversely extending portion 14.

The frame 11 is provided with fixed supporting legs 15 at both ends of the longitudinal section 12, and supporting legs 16 at the ends of the outwardly extending portion 14. The legs 15 which support the frame 11 at the ends of the longitudinal section 12 extend upwardly over the horizontal frame members 17 and the upward extension relative to the legs 15 is shown in the drawings by the numeral 18.

The frame 11 is provided for supporting the table top and the extensions 18 support the saw for engagement with work carried by or resting on the table top 19. The table top 19 is L-shaped in configuration, similar to the shape of the frame 11, and has a longitudinal portion 20 connected to an outwardly extending portion 21. The portion 20 of the table top is adapted to be disposed above the frame 11 and the table top portion 21 is disposed above the frame section 14.

The table top 19 is outlined by a metal frame 22 having an L-shaped section 24 at one end thereof. The frame consisting of the portions 22 and 24 is fixed to the table top 19 by any suitable fastening means. In order to raise the table top 19 I have provided cam members 25 and 26 carried by the table top 19 and frame 11 respectively. The cam members 25 are substantially wedge-shaped for cooperating with the wedge-shaped cam member 26. The cam members 25 are fixed to the lower surface of the table 19 and the cam members 26 are slidably supported on an inturned flange 27 of the frame 11.

For sliding the cam members 26 I have provided a screw 28 rotatably supported on the legs 15 at one end of the frame 11. Two cams 26 are provided along each side member of the frame 11 and are spaced apart along the length thereof. The two cam members 26 on each side of frame 11 are connected by a strap 29. The ends of the strap 29 are secured to the wedges 26 by bolts or other suitable fastening means. The forward end of the strap 29 is provided with a nut 30 disposed outwardly relative to the cam 26 and the connecting strap 29. A screw 28 is rotatably supported in a bearing 31 on one of the legs 15 and the inner end of the screw 28 threadably engages in a nut 30 so that rotation of the screw 28 will effect sliding movement of the cam members 26 along that portion of the frame 11 on which they are supported.

A wheel as 31 is fixed on the outer end of the screw 28 to provide a handle for rotating the screw. Wedges 26 as described above, are provided on both sides of the length of the frame 11 and each pair of the wedges is operated by a screw as described above.

A sprocket as 32 is fixed on the outer end of screws 28 and a chain 34 is trained about both of the sprockets 32 so that rotation of one of the screws 28 will effect simultaneous rotation of the other screw. In this manner since wedges 26 are provided near both ends of the length of the table portion 20, movement of the screws 28 will effect vertical movement of the table portion 20 and this portion of the table will remain in a substantially horizontal position at any one of a selected vertical positions relative to the frame 11.

That portion of the table 19 noted by the numeral 21 extends outwardly from one end of the table portion 20, and due to the weight of this portion of the table top, it will be substantially free from movement due to the sliding of the wedges 26. In order to maintain the entire table 19 level at any selected vertical position and provide for angular variation of the table as desired, there are provided separate cams 35 carried by the outer end of the portion 14 of the frame 11. The cams 35 are of a spiral configuration and rotatably supported on the legs 16. A shaft 36 extends between the pair of legs 16 and is rotatably journalled in one end of a supporting arm 37 fixed at the upper end of the supporting legs 16. A cam 35 is fixed on each end of the shaft 36 and is adapted to engage the under portion of the frame section 24.

A handle as 38 is fixed on the shaft 36 also to provide an operating means for rotating the cams 35 to a selected position. A segment of a grooved arcuate member 39 is fixed on the frame 24 adjacent the shaft 36, and a set screw as 40 is carried by the handle 38 and engages in the groove 41. A nut or other fastening member is carried by the screw 40 on the opposite side of the member 39 so that the handle 38 and cam 35 may be locked in any one of a selected position.

The cams 35 are entirely independent of the action of the cams 26 so that in the operation of raising the table 19 to a seelcted height for use on a level or angular plane, the cams 26 are first moved to their desired position and the cams 35 are subsequently moved to change the elevation of the outwardly extending portion 21 of the table top 19 as desired.

A saw 42 is carried above the table top 19 for cutting work supported thereon. The saw 42 is rotated by a motor or other desired power operator indicated by the numeral 44 in the drawings. The motor 44 is carried by a frame 45 fixed on the upper end of the supporting members 18 which are an extension of the legs 15 above the table top 19. A rail as 46 is carried by the frame 45 and extends along the length of the table top 20. The rail 46 is substantially I-shaped and the lower flange is provided with grooves along the length thereof forming channels in which rollers are adapted to be engaged.

The lower flange 47 of the rail 46 is formed with V-shaped grooves 48 adjacent the outer edges thereof. The grooves 48 extend along the full length of the rail 46 and rollers 49 are rotatably carried by the motor supporting structure engaging in the grooves 48 for supporting the saw blade 42.

An upwardly extending supporting member 50 is fixed to the motor housing and a horizontal plate as 51 is fixed to or formed on the upper end of the member 50. The plate 51 is fixed to an overlying supporting plate 52 by bolts 54 or other suitable fastening means. Upwardly extending and outwardly divergent arms 55 are fixed on opposite sides of the plate 52 and the rollers 49 are secured on the arms 55 by bearings 56. The bearings 56 are disposed in an upwardly converging relation to each other on opposite sides of the plate 52 and support the rollers 49 in a downwardly converging relation one to the other on opposite sides of the rail 46 so that the motor will be slidably supported from the rail and the rollers will be disposed at a downwardly converging angle, thereby minimizing the tendency of the rollers to come out of engagement with the grooves 48 during the sliding movement of the saw 42 along the length of the table 19. In the drawings no operating means is shown for moving the motor along the length of the rail 46 but it is understood that any suitable means, manual or power, may be employed for moving the saw 42 and the motor 44 along the length of the rail.

A suitable guard 57 is provided for concealing the rollers and connection of the motor supporting means. The guard 57 is fixed to the web of the rail 46 and extends outwardly on both sides thereof. The cover 57 extends along the full length of the rail 46 and the rollers are free to move on the base flange of the rail concealed along the entire length of the table top 19.

A suitable housing as 58 is disposed about the saw blade 42 and is provided with an upwardly opening chute 59. The housing 58 and chute 59 are provided to prevent the sawdust coming from the work being operated on from falling freely on the table or the floor below the table.

While not shown in the drawings, any suitable suction means or fan means may be provided for association with the housing 58 to remove the sawdust as desired.

As the saw table 10 is designed principally for cutting plywood or other sheets of veneer, an opening 60 is formed in the portion 20 of the table top 19 and extends substantially along the length of this portion of the table top. The saw 42 is adapted to extend into the opening or groove 60 so that the saw may make a clean cut through thin sheets of veneer supported on the table. As one or a large plurality of sheets of veneer may be cut at one time by this saw, I have provided a gravity operated clamp 61 for holding the sheets of veneer on the table close to the saw blade 42. The clamp 61 is formed of an elongated bar 62 which extends substantially the full length of the portion 20 of the table top 19 parallel to and outwardly of groove 60.

A link as 64 is pivotally mounted to the opposite ends of the bar 62 and the upper end of the links 64 are pivotally connected to the ends of the frame 45. The bar 62 is disposed outwardly relative to the saw 42 on the opposite side thereof from the motor 44. The links 64 are of a greater length than the distance between the upper end of the frame 45 and the table 19 in its lowermost disposition so that when the table top 19 is at its lowermost setting, the links 64 will be disposed at an angle not perpendicular to the length of the table, whereby the weight of the bar 62 will clampingly hold the work onto the table top. When it is desired to clamp a more bulky piece or collection of work onto the table top 19, the bar 62 may be raised manually and when left to hang free from the links 64 will be again gravitatingly biased into engagement with the uppermost piece of work.

The links 64 are of substantially the same length so that the bar 62 will always remain in a plane parallel to the plane of the table top 19. This parallel disposition of the bar 62 is obtained by the 4-bar linkage which includes the frame 45, links 64 and bar 62. The end of the table 19 opposite from the end at which the wheel 31 is disposed is provided with upwardly extending guide plate 65. The plate 65 is fixed to the table top portion 21 and is provided with an opening 66 below the position of the bar 62 so that the bar 62 may clampingly engage even a very thin piece of veneer supported on the table top 19.

In the use and operation of this improved table and saw arrangement, the table top 19 is initially adjusted to a convenient operating level and the work laid on the table 19 is moved upwardly to obtain the desired engagement of the work with the saw 42. The saw 42 is not movable vertically so that the work supported on the table top 19 may be engaged with the saw 42 for any desired depth of cut.

When the wedges 26 have been moved to adjust the table top portion 20 to the desired height, the cams 35 are rocked on the shaft 36 to bring the table portion 21 to a level disposition relative to the portion 20 thereof. The bar 62 will engage the work on the table to provide a gravity type of clamp and the saw motor and saw may be guided along the rail 46 to move the saw along the length of the work.

I do not mean to confine myself to the exact details of construction herein disclosed but claim all variations falling within the purview of the appended claim.

What I claim is:

A saw and saw table comprising a base frame including a pair of horizontally disposed L-shaped guide rails, a saw table above said rails, a pair of lengthwise spaced apart lower cams slidably engaging on each rail, a connecting bar between each pair of cams, a laterally extending lug comprising a nut fixed to one cam of each pair of cams, offset bearings on said frame aligned with said lugs, a cam adjusting screw shaft extending through each bearing threaded into each nut, a sprocket on each shaft, chain means connected between said sprockets, an operating wheel on one shaft, pairs of upper cams fixed to the lower side of said table and engaging said lower cams, a superstructure carried by said base frame and extending above said table, a horizontal guide rail carried by said superstructure, a motor carriage movably engaging said latter rail and depending therebeneath, a motor fixed in depending relation to said carriage, a circular saw secured to said motor, a work clamping bar above said table, and a pair of links pivotally connected between the ends of said bar and said superstructure for maintaining said clamping bar parallel with said table.

WILLIAM C. SCHWANTES.

REFERENCES CITED

The following references are of record in the file of this patent:

UNITED STATES PATENTS

| Number | Name | Date |
| --- | --- | --- |
| Re. 15,837 | Hutchinson | May 13, 1924 |
| Re. 17,329 | Schmidt | June 18, 1929 |
| 105,023 | Wood | July 5, 1870 |
| 223,942 | Musser | Jan. 27, 1880 |
| 225,323 | Bennett | Mar. 9, 1880 |
| 501,521 | Marsh | July 18, 1893 |
| 909,716 | Tubbs | Jan. 12, 1909 |
| 1,496,982 | Dunham | June 10, 1924 |
| 1,794,836 | De Walt | Mar. 3, 1931 |
| 1,842,630 | Rodning | Jan. 26, 1932 |
| 2,396,961 | Meredith | Mar. 19, 1946 |
| 2,435,765 | Anderson | Feb. 10, 1948 |

FOREIGN PATENTS

| Number | Country | Date |
| --- | --- | --- |
| 266,896 | Great Britain | Mar. 10, 1927 |